(12) United States Patent
Kim et al.

(10) Patent No.: US 9,485,474 B2
(45) Date of Patent: Nov. 1, 2016

(54) SYSTEM AND METHOD FOR LEARNING DRIVING INFORMATION IN VEHICLE

(71) Applicant: Electronics and Telecommunications Research Institute, Daejeon (KR)

(72) Inventors: Jinwoo Kim, Daejeon (KR); Woo Yong Han, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 316 days.

(21) Appl. No.: 14/208,276

(22) Filed: Mar. 13, 2014

(65) Prior Publication Data
US 2015/0189241 A1 Jul. 2, 2015

(30) Foreign Application Priority Data

Dec. 27, 2013 (KR) .................. 10-2013-0165059

(51) Int. Cl.
| | | |
|---|---|---|
| H04N 7/18 | (2006.01) | |
| G07C 5/02 | (2006.01) | |
| G06K 9/00 | (2006.01) | |
| B60W 30/00 | (2006.01) | |
| G06T 7/00 | (2006.01) | |
| G06F 3/00 | (2006.01) | |
| G06F 3/01 | (2006.01) | |
| G07C 5/08 | (2006.01) | |

(52) U.S. Cl.
CPC .............. *H04N 7/181* (2013.01); *B60W 30/00* (2013.01); *G06F 3/005* (2013.01); *G06F 3/013* (2013.01); *G06F 3/017* (2013.01); *G06K 9/00832* (2013.01); *G06T 7/0028* (2013.01); *G06T 7/0042* (2013.01); *G07C 5/02* (2013.01); *G06T 2207/10028* (2013.01); *G06T 2207/30268* (2013.01); *G07C 5/0866* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,414,713 | B1* | 7/2002 | Ebisawa | G02B 27/02 348/131 |
| 6,580,373 | B1* | 6/2003 | Ohashi | B60R 1/00 340/425.5 |
| 7,164,117 | B2* | 1/2007 | Breed | B60R 21/01516 250/208.1 |
| 2002/0149544 | A1* | 10/2002 | Rosen | B60K 35/00 345/6 |
| 2002/0196201 | A1* | 12/2002 | Rosen | B60K 35/00 345/7 |
| 2006/0208169 | A1* | 9/2006 | Breed | B60N 2/002 250/221 |
| 2009/0284597 | A1 | 11/2009 | Nakamori et al. | |

(Continued)

FOREIGN PATENT DOCUMENTS

| | | |
|---|---|---|
| KR | 10-2012-0075672 A | 7/2012 |
| KR | 10-2013-0046759 A | 5/2013 |

(Continued)

*Primary Examiner* — Paulos M Natnael
(74) *Attorney, Agent, or Firm* — Rabin & Berdo, P.C.

(57) ABSTRACT

A system for learning driving information in a vehicle, includes a first camera mounted on an inner ceiling of the vehicle and configured to detect a projected position of a nose of a driver; and a second camera mounted on an inner front of the vehicle and configured to detect a front position of the nose of the driver. Further, the system includes a driver's status information processing unit configured to detect the line of sight of the driver by calibrating an image corresponding to the projected position and an image corresponding to the front position in real time, to analyze information about the line of sight that is detected, and to store the analyzed information in a learning data database.

16 Claims, 5 Drawing Sheets

(56) References Cited

U.S. PATENT DOCUMENTS

2012/0154441 A1 6/2012 Kim
2012/0327232 A1 12/2012 Yang et al.
2013/0222599 A1* 8/2013 Shaw .................. G06K 9/60
　　　　　　　　　　　　　　　　348/159

FOREIGN PATENT DOCUMENTS

| KR | 10-2013-0063429 A | 6/2013 |
| WO | WO 2013-085278 A1 | 6/2013 |

* cited by examiner

SYSTEM AND METHOD FOR LEARNING DRIVING INFORMATION IN VEHICLE

CROSS-REFERENCE TO RELATED APPLICATION(S)

The present invention claims priority of Korean Patent Application No. 10-2013-0165059, filed on Dec. 27, 2013, which is incorporated herein by reference.

FIELD OF THE INVENTION

The present invention relates to a technology for learning driving information in a motor vehicle, and more particularly, to a system and method for learning driving information in a motor vehicle adapted to provide an interactive learning environment interacting between a driver and the vehicle by analyzing an augmented reality for the vehicle, a driver status, and the like.

BACKGROUND OF THE INVENTION

In recent years, a technology that provides various pieces of information in a vehicle is launched in a vehicle infortainment market. For example, research for a multi-modal interface-based information manipulating technique which is the combination of speech recognition, gesture recognition, augmented reality, digital cluster, HUD (Head-Up Display) has been extensively made in order for providing a safety and ease of operation.

However, a driver has no choice but to issue a restricted order by taking a simple action because of the vehicle stability, which does not give the feedback of necessary and sufficient conditions for the driver. Moreover, reality is that each interface is commonly applied for all drivers rather than to learn the characteristics of a driver through the interaction with the driver to develop the interface.

Therefore, there is a need for studies of customized multi-modal interfaces that are capable of complementing a characteristic and habit of the driver by monitoring and correcting them in a driver-customized system and a driver assistance system, as well as an autonomous vehicle system.

Further, a driver needs to fix a line of sight in order to manipulate each entity of multimedia in a conventional vehicle interface, which results in reducing a driving concentration of the driver. Therefore, in order to intelligently display various multimedia entities in compliance with a voice instruction or simple gesture from the driver on a front windshield of the vehicle, it is required for the construction of learning data for the provision of an efficient user experience (UX). In other words, the line of sight of the driver needs to face forward and the driver should manipulate the entity close to the driver's seat in an intuitive manner within a range that does not interfere with the view or squint. Further, in order to drive the driver assistance system by sensing the danger, it is necessary to analyze in real time driving habits in accordance with the line of sight of the driver and information about the interface and then complement them mutually.

SUMMARY OF THE INVENTION

In view of the above, the present invention provides a customized multi-modal interface that is capable of analyzing different patterns of a registered driver by tracking a line of sight of the driver and learning the result of the tracking of the line of sight and its corresponding action.

Further, the present invention provides a multi-modal interface-based driver's status recognition system that is updatable by displaying augmented reality-based information in a motor vehicle based on voice and gesture recognition and identifying safety depending on driving patterns recognizing after tracking a line of sight in advance and performing a modeling procedure of the inner/exterior of the vehicle.

Specifically, the present invention provides a customized multi-modal interface that activates (or initiates) a system through the use of a driver's voice, detects a driver's face, eyes, mouth, and the like and tracks the line of sight of the driver by rotating and moving a front camera in a vehicle toward the driver (a source of the voice), thereby utilizing in an additional assistance equipment and a system calling function.

In accordance with a first aspect of the present invention, there is provided a system for learning driving information in a vehicle. The system includes a first camera mounted on an inner ceiling of the vehicle and configured to detect a projected position of a nose of a driver; a second camera mounted on an inner front of the vehicle and configured to detect a front position of the nose of the driver; a driver's status information processing unit configured to detect the line of sight of the driver by calibrating an image corresponding to the projected position and an image corresponding to the front position in real time, to analyze information about the line of sight that is detected, and to store the analyzed information in a learning data database.

Further, the first camera may have a capability of rotation and movement.

Further, the first camera may comprise a depth sensor.

Further, the driver's status information processing unit may update the learning database.

Further, the system may further comprise a voice recognition unit configured to recognize a voice of the driver who gets in the vehicle and provide information about the recognized voice to the driver's status information processing unit.

Further, the system may further comprise a camera controlling unit configured to calibrate the operations of the first camera and second camera in accordance with the processed result from the driver's status information processing unit.

Further, the system may further comprise a user interface unit configured to input user interface information to the driver's status information processing unit or receive a feedback on the processed result of a user interface from the driver's status information processing unit.

Further, the user interface may be based on a multi-modal interface.

Further, the system may further comprise a network configured to exchange learning data in the learning database with another system for learning driving information in the other vehicle.

In accordance with a second aspect of the present invention, there is provided a method for learning driving information in a vehicle through the use of images captured by first and second cameras. The method includes recognizing a voice of a driver when the driver is detected in the vehicle; recognizing a face image of the driver through the first and second cameras; calculating a mutual location between the first and second cameras; detecting a uttered position of the voice and a location of a face of the driver by moving and rotating each of the first and second cameras; and building learning data by tracking a line of sight of the driver.

Further, the recognizing a face image may comprise recognizing information of the driver after temporally storing the images captured by the first and second cameras; determining whether the driver who gets in the vehicle is a pre-registered driver based on the driver information; registering the driver information of the driver who gets in the vehicle when the driver is a pre-registered driver; and registering the driver as a new driver when the driver is not a pre-registered driver.

Further, the first camera may be mounted on an inner ceiling of the vehicle and is configured to detect a projected position of a nose of the driver.

Further, the second camera may be mounted on an inner front of the vehicle and is configured to detect a front position of the nose.

Further, the building learning data may comprise recognizing the line of sight of the driver in the vehicle to detect driver information of the driver; and storing learning data from the detected driver information.

Further, the building learning data may comprise combining one or more a voice instruction, gesture instruction of the driver, or a line of sight of the driver in accordance with the detected driver information.

Further, the building learning data may comprise updating the learning data in real time; and providing a feedback on learning data that is updated in real time to the learning data that is built previously.

In accordance with an embodiment of the present invention, the user interface provides an environment that can efficiently manipulate huge infotainment during the driving of the vehicle, and the use of it will be greatly expanded. Further, it is possible to use the user interface of the present invention to share information with a passenger in a passenger seat as well as the driver with the connectivity between them. Furthermore, a vehicle augmented reality, gesture recognition, and voice recognition may be are built as a mutually complementary UX. Therefore, it is possible to display various pieces of information on a location which is most visible by the driver by providing a customized UX for each driver and control the information intuitively and efficiently the UX. The user interface is expected to be likely to be developed as an intelligent UX in maintaining a mutually complementary relationship between a human and next-generation intelligent unmanned driverless car and building an important tool for human communication nearest to the vehicle.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

The embodiment of the present invention is directed to a system for learning driving information in a vehicle having two cameras arranged opposite to a driver in which driver's face information is detected by tracking a line of sight of the driver through the cameras and the detected face information and driver's voice and gesture information are stored as customized learning data.

More specifically, the system is adapted to track a forward-looking direction of the driver by detecting a projected position of a nose through a first camera which has a depth sensor and is disposed at a position so as to face the top of a driver's head, simultaneously to detect a front position of the nose from a driver' face through a second camera, and to exactly recognize the line of sight of the driver by correcting in real time the projected position obtained from the first camera and the front position obtained from the second camera.

Moreover, in manipulating an infortainment system and displaying information about an augmented reality in compliance with the line of the sight of the driver, the system is also adapted to analyze the line of sight of the driver when recognizing the driver's voice or gesture to store it as a driving learning DB and continuously update a driving learning DB, thereby implementing a robust environment to recognize the driver.

Hereinafter, the embodiments of the present invention will be described in detail with reference to the accompanying drawings which form a part hereof.

Figure 1:
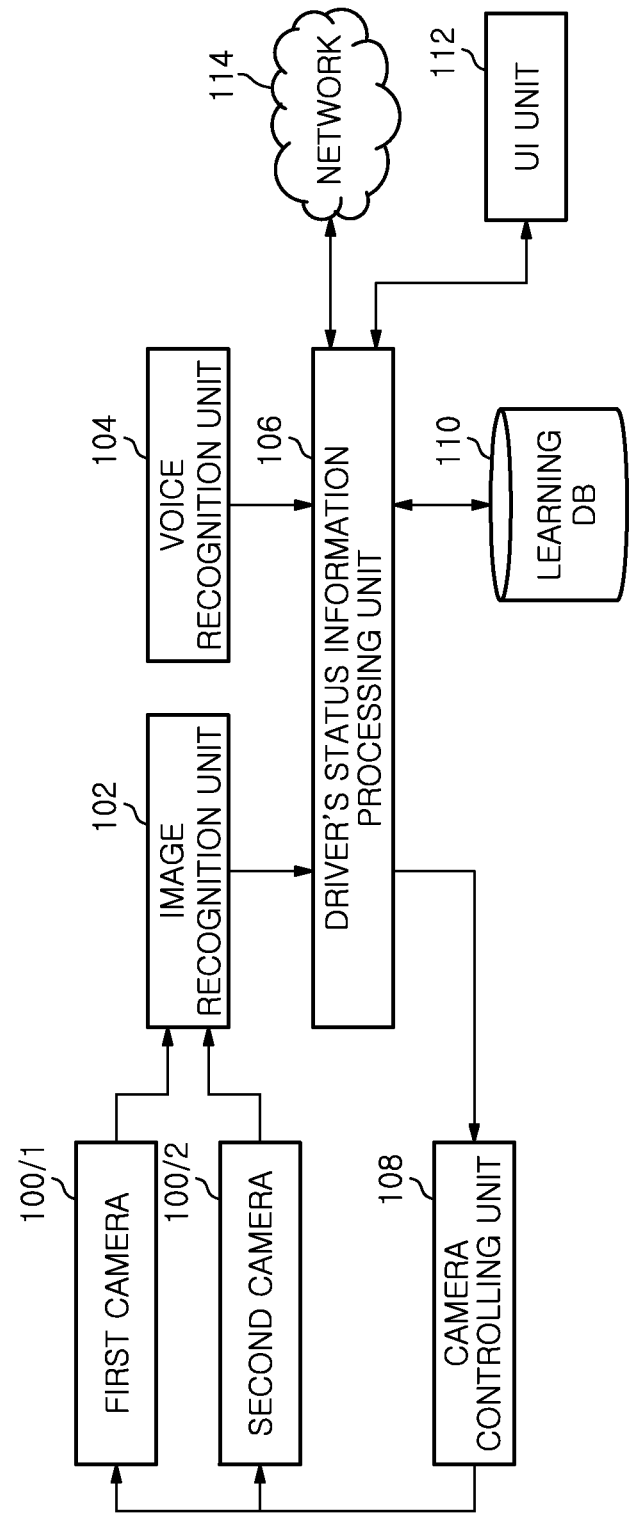
FIG. 1 illustrates a block diagram of a system for learning driving information in a vehicle in accordance with an embodiment of the present invention.

FIG. 1 illustrates a block diagram of a system for learning driving information in a vehicle in accordance with an embodiment of the present invention. The learning system may include a first camera 100/1, a second camera 100/2, an image recognition unit 102, a voice recognition unit 104, a driver's status information processing unit 106, a camera controlling unit 108, a driving learning DB 110, and a user interface (UI) for a driver 112.

As illustrated in the drawing, the first camera 100/1 may capture a projected position of a driver's nose from a position so as to face the top of the driver's head, and the second camera 100/2 may capture a front position of the driver's noise at the front of the driver.

The image recognition unit 102 may recognize image information captured by the first camera 100/1 and the second camera 100/2 and may provide the recognized image information to the driver's status information processing unit 106.

The voice recognition unit 104 may recognize a driver's voice and may provide the recognized voice to the driver's status information processing unit 106.

The driver's status information processing unit 106 may track a line of sight of the driver by detecting the projected position of the nose of the driver from the image information provided from the image recognition unit 102, may detect the front position of the nose, and may identify the line of sight of the driver by correcting information about the projected position and the front position in real time. The information about the line of sight and the corrected information may then be stored as learning data in the driving learning DB 110. The stored learning data will be updated in real time and utilized as real-time learning data.

Also, the driver's status information processing unit 106 may process the voice information provided from the voice recognition unit 104 and may store the processed voice information in the driving learning DB 110.

Further, the driver's status information processing unit 106 may process the driver's status based on the image information and the voice information and may provide the processed result to the camera controlling unit 108, so that the camera controlling unit 108 can control the first camera 100/1 and the second camera 100/2.

Further, the driver's status information processing unit 106 may be connected to the UI unit 112 and receive a user instruction (for example, a voice and gesture based multi-modal interface instruction) through the UI unit 112.

Furthermore, the driver's status information processing unit 106 may be connected to a network 114 through which external learning data is received and store the external learning data in the driving learning DB 110 or transmits the learning data stored in the driving learning DB 110 through the network 114.

The camera controlling unit 108 may function to control the first camera 100/1 and the second camera 100/2 in accordance with the processed result from the driver's status information processing unit 106. Specifically, the camera controlling unit 108 may calibrate the operations of the first camera 100/1 and the second camera 100/2 in real time in accordance with the processed result from the driver's status information processing unit 106. The calibration of the first camera 100/1 and the second camera 100/2 can be made with reference to a particle sensor fixedly mounted in the respective cameras by software, and the calibration between them may be made by hardware.

The driving learning DB 110 may store the image information and the voice information that are processed by the driver's status information processing unit 106 and update them. If necessary, the driving learning DB 110 may give a feedback on the stored image information and voice information to the driver's status information processing unit 106.

The UI unit 112, for example, to which a multi-modal based manipulation technique is applicable, may input a multi-modal UI information (e.g., such as a gesture, voice call, or the like) to the driver's status information processing unit 106 or may receive a feedback on a multi-modal UI processed result from the driver's status information processing unit 106.

The network 114 may be, for example, a wireless network, and may transmit to and receives from the learning data another driving learning system, that is, a driving information learning system mounted the other vehicles so that the learning data can be shared and complemented between the driving information learning systems.

As described above, the driving information learning system fundamentally may manage a driver's status and priority, distribute the concentration of the line of sight of the driver, and synchronize the driver's voice (the multi-modal interface) and the image (the gesture recognized image).

A description will be made, with reference to FIG. 2, on a multi-camera calibration for a vehicle driving information learning performed through the interaction between the first camera 100/1 and the second camera 100/2 and the driver's status information processing unit 106.

Figure 2:
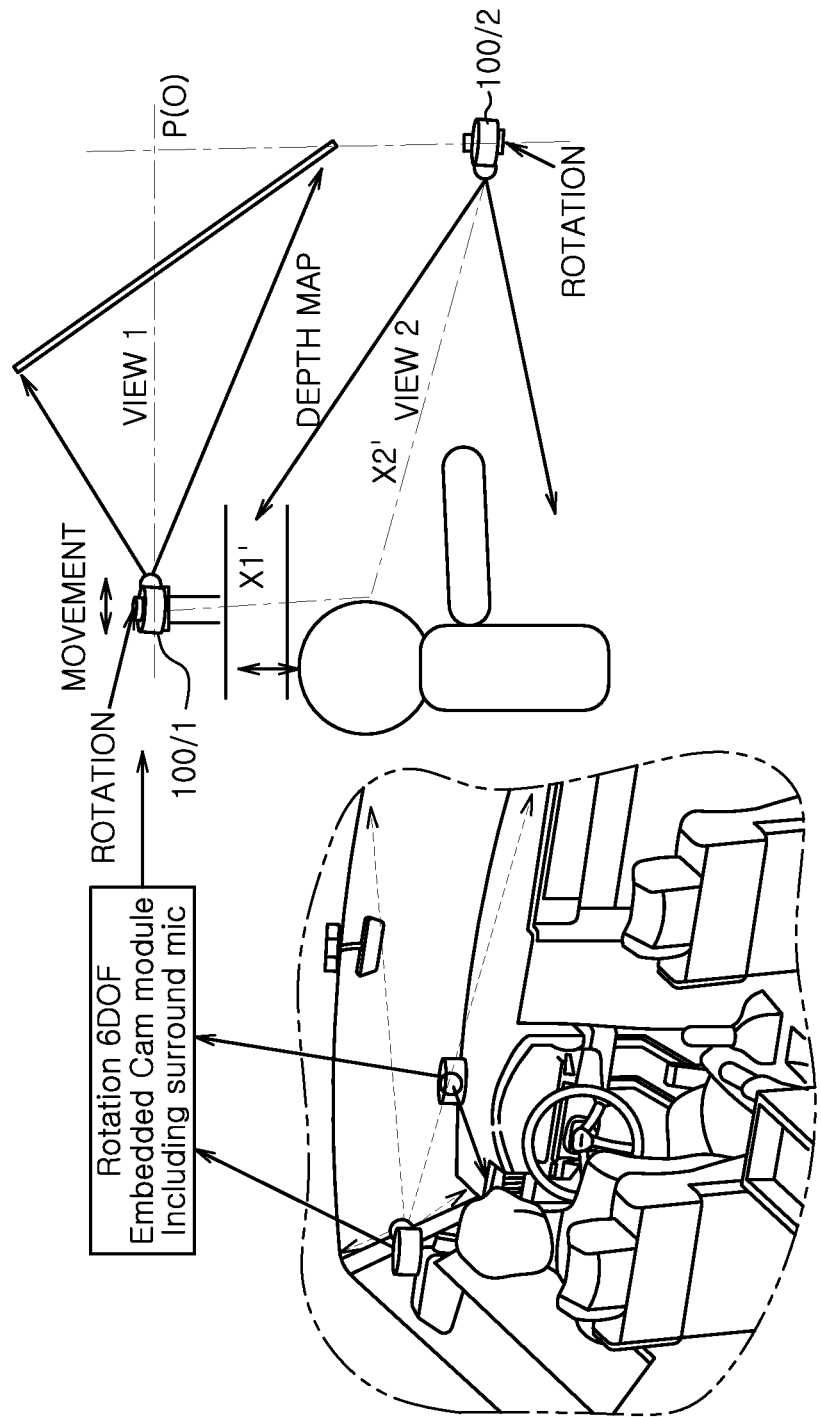
FIG. 2 shows a conceptual diagram explaining the relationship of a multiple cameras calibration used to extract a driver's face location in a system for learning driving information in a vehicle to drive a vehicle in accordance with an embodiment of the present invention.

As shown in FIG. 2, the first camera 100/1 may be mounted on a celling facing the upper portion of the driver seat so as to be rotated and moved and may include a depth sensor. The first camera 100/1 may detect the projected position of the driver's nose by extracting a depth map at the top of the driver's head. In other words, the location of the nose may be the location at which the most prominent projection in a direction of P (O) is extracted from the depth map.

The second camera 100/2 may be mounted on the front of the vehicle and may detect the front position of the nose from the driver's face.

That
is, the embodiment of the present invention is adapted to exactly recognize the line of sight of the driver through the comparison and matching and the real-time calibration of the projected position provided from the first camera 100/1 and the front position provided from the second camera 100/2. In this connection, the first camera 100/1 is used for modeling of an inner view of the vehicle and the second camera 100/2 is used for modeling of a view of the driver.

The first camera 100/1 identifies the location of the driver's head as a point that is optimized in the depth map from the depth sensor (that is, the nearest point from the head) and then performs a positioning and rotation thereof. Additionally, in consideration of the seat position of the driver, the system may extract the learning data depending on a distance away from a backrest or a head rest, speed of the vehicle, an external environment, a travelling environment, an auxiliary environment, etc. among usual driving habits of the driver.

In accordance with the embodiment of the present invention, the system may built a relationship between a pre-modeled data from the first camera 100/1, the time for which the line of sight of the driver remains, a viewing direction, an inputted voice of the driver, a gesture recognition in order to introduce the data into the system.

Hereinafter, the method for learning driving information in a vehicle will be described with reference to FIGS. 3 to 5 along with the system having the aforementioned configuration.

Figure 3:
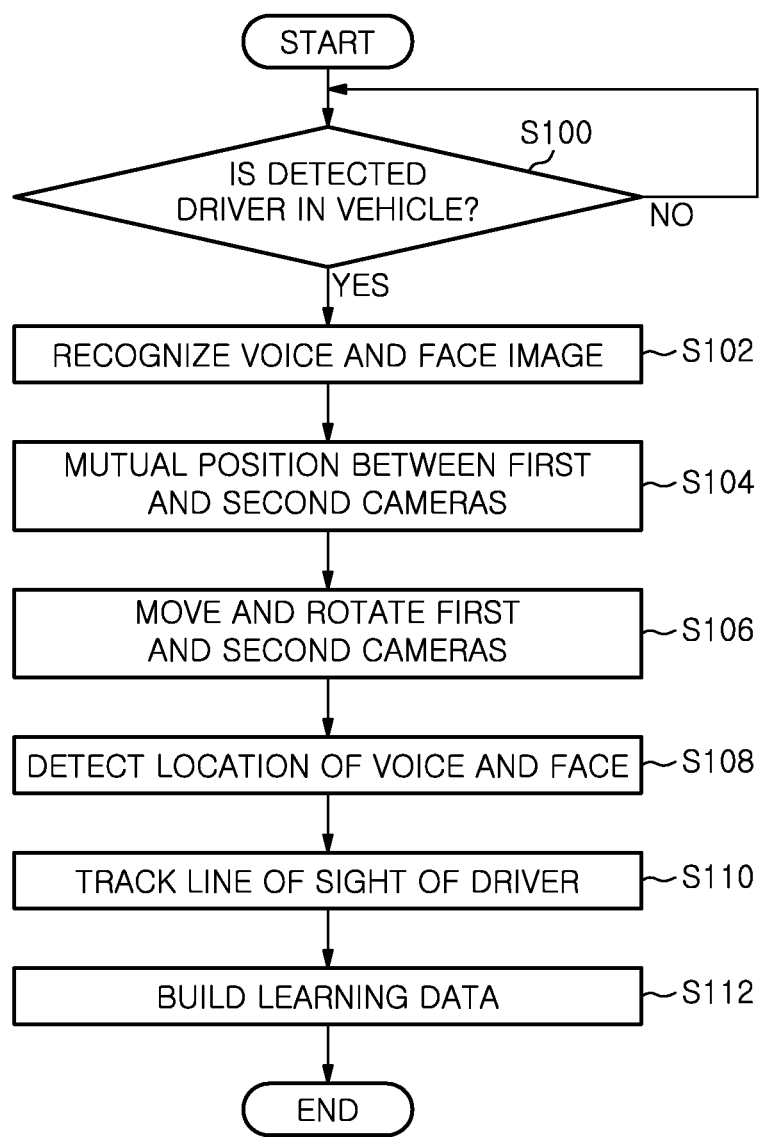
FIG. 3 illustrates a flow chart of a method for learning driving information in a vehicle in accordance with an embodiment of the present invention.

FIG. 3 depicts an overall flow chart of a method for learning driving information in a vehicle in accordance with an embodiment of the present invention.

Referring to FIG. 3, first, when a driver in the vehicle is detected by the first camera 100/1 and the second camera 100/2 (Block S100), the image recognition unit 102 of the system recognizes an image of the driver, in particular, a face image of the driver and also recognizes a voice of the driver (Block S102).

The process for the voice and face image recognition will be described with reference to FIG. 4 in more detail.

Figure 4:
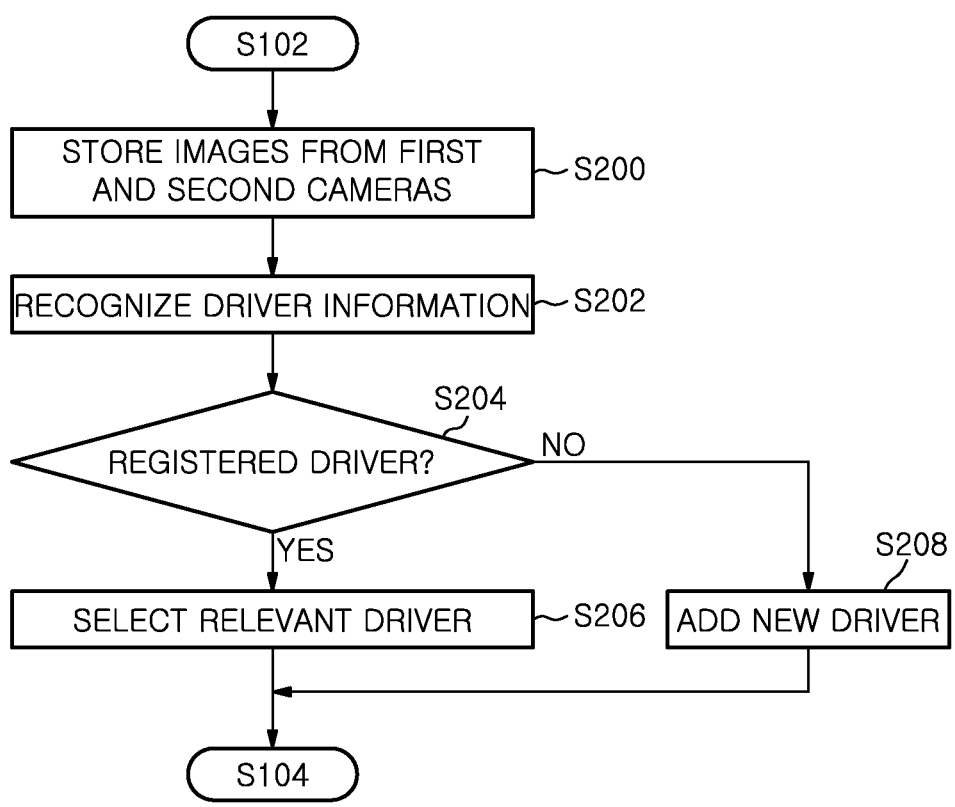
FIG. 4 depicts a flow chart illustrating in detail a process of recognizing a driver's voice and face image that is shown in FIG. 3.

As illustrated in FIG. 4, the system temporally stores the image captured by the first camera 100/1 and the image captured by the second camera 100/2 before providing them to the image recognition unit 102 (Block S200).

The image recognition unit 102 recognizes the relevant image and then provides the recognized result to the driver's status information processing unit 106 (Block S202). At the same time, the voice recognition unit 104 recognizes the relevant voice and then provides the recognized result to the driver's status information processing unit 106.

The driver's status information processing unit 106 determines that the driver who gets in the vehicle is a pre-registered driver based on the image-recognized result of from the image recognition unit 102 and the voice-recognized result from the voice recognition unit 104 (Block S204).

If the driver is determined to be a pre-registered driver form the result of the determination in Block S204, one, the driver's status information processing unit 106 selects information about the driver and allows the driver to receive a process for the driving information learning (Block S206).

However, as a result of the determination in Block S204, when the driver is not a pre-registered driver, the method goes to Block S208 where the driver is registered as a new driver by the driver's status information processing unit 106.

Referring to FIG. 3 again, after the relevant driver is selected in Block S102, the driver's status information processing unit 106 calculates a mutual location between the first camera 100/1 and the second camera 100/2 (Block S104).

Information on the position calculated by the driver's status information processing unit 106 is then provided to the camera controlling unit 108, which in turn controls to drive the first camera 100/1 and the second camera 100/2. For example, the first camera 100/1 and the second camera 100/2 can be rotated or moved toward the location of the driver (a location based on a direction vector component at which the voice is originated) under the control of the camera controlling unit 108 (Block S106).

Thereafter, the driver's status information processing unit 106 detects a face of the driver captured by the second camera 100/2 depending on the location information of the driver's face (Block S108).

In accordance with the detection of the driver's face, the driver's status information processing unit 106 detects the eye of the driver through the second camera 100/2 and tracks the line of sight of the driver (Block S110).

A technique to track the line of sight of the driver is well known to those skilled in the art, and thus detailed description will be omitted. The embodiment of the present invention aims to achieve the accurate recognition of the line of sight and minimize an error through the mutual relationship between the first camera 100/1 and the second camera 100/2, rather than to track the line of sight of the driver. These have been already been explained through FIG. 2 and its related description.

In a driving method, when the driver gets in the motor vehicle and the voice or face of the driver enters an area of the cameras, the method determines whether the driver is a pre-registered driver. If the driver is not a pre-registered driver, the driver is registered as a new driver. Thereafter, when the face and voice of the driver are inputted, the method advances to a process for the authentication of the driver and recognition of the location of the uttered voice and the driver. A first step of the process is to calculate the position between the first camera and the second camera to rotate the cameras toward the location of the driver (based on a direction vector component at which the voice is originated). Subsequently, the face of the driver is detected by the use of the second camera on the basis of the location information of the face and the eye is then detected, followed by the tracking of the line of sight of the driver. The method of tracking the line of sight of the driver will not be described in this disclosure.

The method suggested in the embodiment is intended to reduce the error by additionally combining the mutual relationship between the first camera and the second camera, which has been described through FIG. 2.

After tracking the line of sight of the driver, the process of building the learning data is continued in accordance with an embodiment of the present invention (Block S112).

Figure 5:
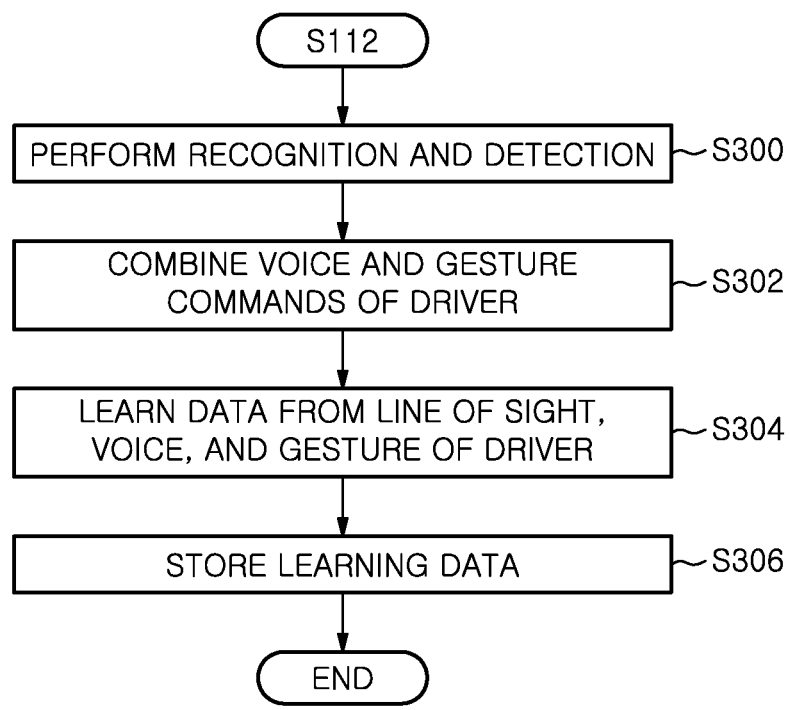
FIG. 5 depicts a flow chart illustrating in detail a process of building learning data that is shown in FIG. 3.

FIG. 5 depicts a flow chart of a detailed process of building the learning data (Block S112).

As illustrated in FIG. 5, once the line of sight of the driver is tracked, the driver's status information processing unit 106 performs the recognition of the line of sight of the driver and the detection of user information (Block S300).

By passing through the above processes, the voice instruction and gesture instruction are combined (Block S302).

Next, a learning is performed on data from the line of sight of the driver, voice, gesture, and the like (Block S304), thereby building the learning data (Block S306).

The learning data may be updated in real time, and the updated learning data may be provided as a feedback to Block S300 for the recognition and detection, thereby enabling the driver to make the development of a customized recognition engine.

As set forth above, in accordance with an embodiment of the present invention, it is possible to provide the multi-modal interface that is capable of analyzing different patterns of a registered driver by tracking a line of sight of the driver and learning the result of the tracking of the line of sight and its corresponding action. Also, it is possible to provide the multi-modal interface-based driver's status recognition system that is updatable by displaying augmented reality-based information in a motor vehicle based on voice and gesture recognition and identifying safety depending on driving patterns recognizing after tracking a line of sight in advance and performing a modeling procedure of the inner/exterior of the vehicle. Specifically, it is possible to provide a customized multi-modal interface that activates (or initiates) a system through the use of a driver's voice, detects a driver's face, eyes, mouth, and the like and tracks the line of sight of the driver by rotating and moving a front camera in a vehicle toward the driver (a source of the voice), thereby utilizing in an additional assistance equipment and a system calling function.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A system for learning driving information in a vehicle, the system comprising:
    a first camera mounted on an inner ceiling of the vehicle and configured to detect a projected position of a nose of the driver;
    a second camera mounted on an inner front of the vehicle and configured to detect a front position of the nose of the driver;

a driver's status information processing unit configured to
detect the line of sight of the driver by calibrating an image corresponding to the projected position and an image corresponding to the front position in real time,
analyze information about the line of sight that is detected, and
store the analyzed information in a driving learning database as learning data,
wherein the driver's status information processing unit is further configured to
recognize driver information of the driver after temporally storing images captured by the first and second cameras,
determine whether the driver who gets in the vehicle is a pre-registered driver based on the driver information,
register the driver information of the driver who gets in the vehicle when the driver is the pre-registered driver, and
register the driver as a new driver when the driver is not the pre-registered driver.

2. The system of claim 1, wherein the first camera has a capability of rotation and movement.

3. The system of claim 1, wherein the first camera comprises a depth sensor.

4. The system of claim 1, wherein the driver's status information processing unit updates the driving learning database.

5. The system of claim 1, further comprising:
a voice recognition unit configured to recognize a voice of the driver who gets in the vehicle and provide information about the recognized voice to the driver's status information processing unit.

6. The system of claim 1, further comprising:
a camera controlling unit configured to calibrate the operations of the first camera and second camera in accordance with a processed result from the driver's status information processing unit.

7. The system of claim 1, further comprising:
a user interface unit configured to input user interface information to the driver's status information processing unit or receive a feedback on a processed result of a user interface from the driver's status information processing unit.

8. The system of claim 7, wherein the user interface is based on a multi-modal interface.

9. The system of claim 1, wherein the learning data in the driving learning database is exchanged with another system to learn driving information in another vehicle.

10. A method for learning driving information in a vehicle through the use of images captured by first and second cameras, the method comprising:
recognizing a voice of a driver when the driver is detected in the vehicle;
recognizing a face image of the driver through the first and second cameras;
calculating a mutual location between the first and second cameras;
detecting an uttered position of the voice and a location of a face of the driver by moving and rotating each of the first and second cameras; and
building learning data by tracking a line of sight of the driver,
wherein said recognizing a face image comprises:
recognizing driver information of the driver after temporally storing the images captured by the first and second cameras;
determining whether the driver who gets in the vehicle is a pre-registered driver based on the driver information;
registering the driver information of the driver who gets in the vehicle when the driver is a pre-registered driver; and
registering the driver as a new driver when the driver is not a pre-registered driver.

11. The method of claim 10, further comprising:
detecting a projected position of a nose of the driver using the first camera, which is mounted on an inner ceiling of the vehicle.

12. The method of claim 10, further comprising:
detecting a front position of the nose of the driver using the second camera, which is mounted on an inner front of the vehicle.

13. The method of claim 10, wherein said building learning data comprises:
recognizing the line of sight of the driver in the vehicle to detect the driver information of the driver; and
storing learning data from the detected driver information.

14. The method of claim 13, wherein said building learning data comprises:
combining one or more of a voice instruction, a gesture instruction of the driver, or the line of sight of the driver in accordance with the detected driver information.

15. The method of claim 10, wherein said building learning data comprises:
updating the learning data in real time;
providing a feedback based on the learning data that is updated in real time from the learning data that is built previously.

16. A system for learning driving information in a vehicle, the system comprising:
a first camera mounted on an inner ceiling of the vehicle and including a depth sensor, the depth sensor being configured to capture first image information of a driver of the vehicle, the first image information comprising a depth map image of the driver's head;
a second camera mounted on an inner front of the vehicle and configured to capture second image information of the driver;
a driver's status information processing unit configured to
detect a projected position of a nose of the driver from the depth map image, the projected position of the nose of the driver being the most prominent feature in a forward-looking direction of the driver in the depth map image,
detect a front position of the nose of the driver from the second image information,
detect the line of sight of the driver by calibrating the first image information corresponding to the projected position of the nose of the driver and the second image information corresponding to the front position of the nose of the driver,
analyze information about the line of sight that is detected, and
store the analyzed information in a driving learning database as learning data.

\* \* \* \* \*